United States Patent
John et al.

(10) Patent No.: US 12,109,758 B2
(45) Date of Patent: Oct. 8, 2024

(54) DEVICE FOR INFLUENCING THE VOLUMETRIC FLOW OF EXTRUDED PLASTICALLY DEFORMABLE MATERIAL

(71) Applicant: Fraunhofer-Gesellschaft Zur Foerderung Der Angewandten Forschung E.V., Munich (DE)

(72) Inventors: Christopher John, Chemnitz (DE); Tobias Sauerstein, Zittau (DE); Martin Kausch, Chemnitz (DE); Johannes Blase, Chemnitz (DE); Stefan Uhlmann, Chemnitz (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 662 days.

(21) Appl. No.: 17/274,490

(22) PCT Filed: Sep. 5, 2019

(86) PCT No.: PCT/EP2019/073643
§ 371 (c)(1),
(2) Date: Mar. 9, 2021

(87) PCT Pub. No.: WO2020/057983
PCT Pub. Date: Mar. 26, 2020

(65) Prior Publication Data
US 2021/0347117 A1    Nov. 11, 2021

(30) Foreign Application Priority Data
Sep. 21, 2018    (DE) ...................... 10 2018 216 149.6

(51) Int. Cl.
*B29C 64/209*    (2017.01)
*B29C 48/25*     (2019.01)
(Continued)

(52) U.S. Cl.
CPC ........ *B29C 64/209* (2017.08); *B29C 48/2556* (2019.02); *B29C 48/2694* (2019.02);
(Continued)

(58) Field of Classification Search
CPC . B29C 48/695; B29C 48/255; B29C 48/2694; B29C 45/1606
See application file for complete search history.

(56) References Cited

U.S. PATENT DOCUMENTS

| 4,761,129 A | 8/1988 | Aste et al. |
| 4,984,977 A | 1/1991 | Grimminger et al. |

(Continued)

FOREIGN PATENT DOCUMENTS

| CN | 104802405 | 7/2015 |
| DE | 1937862 | 2/1971 |

(Continued)

OTHER PUBLICATIONS

International Search Report.
German Office Action.

*Primary Examiner* — Xiao S Zhao
*Assistant Examiner* — Nicholas J Chidiac
(74) *Attorney, Agent, or Firm* — Jacobson Holman PLLC

(57) ABSTRACT

A device for influencing the volume flow of extruded plastically deformable material conveyed to an outlet nozzle. A flange arranged between an extrusion unit and an outlet nozzle and is connected to the extrusion unit and the outlet nozzle. A duct from the extrusion unit and the outlet nozzle is incorporated in the flange. A piston is mounted in the flange to be rotatable perpendicular to the longitudinal axis of the duct and is located through the duct. In the piston there is a hole which opens into a bypass duct routed to a bypass nozzle. On the outer lateral surface of the piston there is at least one groove in the region of the duct so that, (Continued)

depending on the angular positions of the piston, material can be conveyed through the at least one groove to the outlet nozzle or through the hole to the bypass nozzle.

5 Claims, 2 Drawing Sheets

(51) Int. Cl.
    *B29C 48/255*     (2019.01)
    *B29C 48/395*     (2019.01)
    *B29C 48/72*     (2019.01)
    *B29C 64/118*     (2017.01)
    *B33Y 30/00*     (2015.01)

(52) U.S. Cl.
    CPC .......... *B29C 48/397* (2019.02); *B29C 48/725* (2019.02); *B29C 64/118* (2017.08); *B33Y 30/00* (2014.12); *B29C 2948/926* (2019.02); *B29C 2948/92904* (2019.02); *B29C 2948/92961* (2019.02)

(56) References Cited

U.S. PATENT DOCUMENTS

| | | | |
|---|---|---|---|
| 5,102,323 | A | 4/1992 | Blemberg |
| 6,196,267 | B1 * | 3/2001 | Rutz ..................... B29C 48/255 137/625.16 |
| 10,220,561 | B2 * | 3/2019 | Truscott .................. B29C 48/03 |
| 10,252,457 | B2 * | 4/2019 | Truscott ................ B29C 48/307 |
| 10,828,820 | B2 * | 11/2020 | Woodcock .......... B29C 48/6912 |
| 10,882,068 | B2 * | 1/2021 | O'Hare ................. B05C 5/0233 |
| 2016/0325476 | A1 * | 11/2016 | Truscott ................ B29C 48/302 |
| 2017/0072612 | A1 * | 3/2017 | Truscott .................. B29C 48/08 |
| 2018/0345561 | A1 * | 12/2018 | Woodcock .......... B29C 48/6912 |
| 2019/0047219 | A1 | 2/2019 | Chesser et al. |
| 2019/0217324 | A1 * | 7/2019 | O'Hare ................. B05C 5/0258 |

FOREIGN PATENT DOCUMENTS

| | | |
|---|---|---|
| DE | 8712896 | 1/1989 |
| DE | 3815897 | 7/1989 |
| DE | 102005007102 | 8/2006 |
| DE | 102016213439 | 1/2018 |
| EP | 3308939 | 4/2018 |
| WO | WO 2014085842 | 12/2013 |

\* cited by examiner

DEVICE FOR INFLUENCING THE VOLUMETRIC FLOW OF EXTRUDED PLASTICALLY DEFORMABLE MATERIAL

BACKGROUND OF THE INVENTION

The invention relates to a device for influencing the volume flow of extruded plastically deformable material. In the process, a start-stop function for extrusion-based processes, combined with the additional functionality of volume flow control, can be implemented.

According to the current state of the art, extrusion-based processes follow a continuous procedure. Due to its characteristics, it is not possible to briefly pause the process on short notice, and subsequently restart it, and this has not been necessary, or pursued technologically, in existing applications.

In the area of generative manufacturing, which is being employed on an increasing scope, the use of extrusion-based methods offers great development potential given the high achievable discharge performance. On the other hand, the aforementioned process characteristics make the process-related pausing of the material discharge impossible. This circumstance results in a range of issues, from insufficient component accuracy, through excessive material application, to damage to the component structure. The ability to use extrusion-based 3D printing is thus limited to a significant degree.

The characteristics of extrusion-based processes represent a high technical hurdle in the production of high-quality components having complex inner structures, for the use in the field of generative manufacturing.

Conventional extrusion is designed as a continuous process and not dependent on/designed for brief pausing. A corresponding function is thus not provided for in presently available systems.

In the area of generative manufacturing, no practicable solution exists for the current problem. The majority of users of extrusion-based systems interrupt the material flow, for example, by interrupting the rotation of the screw, and tolerates the resulting overcharging/overextrusion, lag, imperfections, inconsistencies in the strand width or dimensional deviations.

SUMMARY OF THE INVENTION

It is thus the object of the invention to provide options for influencing the volume flow of an extruded plastically deformable material which is fed from an outlet die.

In accordance with the invention, this object is achieved by a device having the features of the claims.

The device according to the invention for influencing the volume flow of extruded plastically deformable material, which is fed to an outlet die during the additive production of components, is arranged between an extrusion unit and an outlet die, and a flange is connected to the extrusion unit and the outlet die. A channel that, proceeding from the extrusion unit, runs to the outlet die is formed in the flange. The outlet die can also be formed at the flange.

A piston is mounted in the flange so as to rotate perpendicularly to the longitudinal axis of the channel and is guided through the channel. In the piston, a borehole is formed in the region of the channel through which the extruded plastically deformable material is fed, the borehole opening into a bypass channel that runs through the piston to a bypass die.

In addition to the borehole, a groove is furthermore formed in the region of the channel on the outer lateral face of the piston, which is arranged in a different angular range than the borehole or guided around the borehole, so that extruded plastically deformable material can be fed, at predefinable angular positions of the piston, through the groove in the direction of the outlet die and/or through the borehole and the bypass channel out of the bypass die.

Extruded plastically deformable material exiting the bypass die can be returned to the extrusion unit or be temporarily stored in a collection receptacle.

The piston can thus be rotated into certain angular positions, in which either extruded plastically deformable material can be fed exclusively through the groove, simultaneously through the groove, in the direction of the outlet die, and the borehole with the bypass channel through the bypass die, or exclusively through the borehole, the bypass channel and the bypass die. In this way, it is possible to achieve that the volume flow is influenced by way of the two options mentioned first, and to achieve that feeding of extruded plastically deformable material for manufacture is halted by way of the latter option.

The at least one groove should be formed in the outer lateral face of the piston across an angular range of at least 180° in the direction of rotation of the piston.

The at least one groove can have a free cross-section that varies in a stepped or continuous manner across the length thereof, through which extruded plastically deformable material can be fed to the outlet die, when the piston has been rotated into an appropriate angular position. In this way, it can be achieved that, during a rotation of the piston, an accordingly long region of the at least one groove can be provided, through which extruded plastically deformable material can be fed to the outlet die. Due to the variation of the free cross-section across the length of the groove, the volume flow that can be fed through the groove can be varied by a defined rotation of the piston. In the process, the at least one groove should be designed across an angular range that is greater than 180°.

Multiple grooves can be formed in angular ranges that are offset from one another, at the outer lateral face of the piston. In this way, it is likewise possible to influence the volume flow that can be fed to the outlet die, by rotating the piston such that extruded plastically deformable material can be fed solely through one of the grooves or simultaneously through multiple grooves to the outlet die.

The piston should advantageously be connected to a rotary drive controllable by open-loop and/or closed-loop control. This rotary drive can, in turn, be influenced by the electronic controller, which is used anyhow for the particular additive production of components, so as to influence, or completely halt, the volume flow of extruded plastically deformable material fed for manufacturing.

The flange is connected at one side to an extrusion unit, which comprises at least one extrusion screw that is rotatably mounted in the extrusion pipe. A plasticizing unit can additionally be an integral part of an extrusion unit. This is advantageous when thermoplastic material is to be extruded, which is to be heated to an appropriate temperature. However, it is also possible to use suspensions or pastes as the plastically deformable material, in which heating can possibly be dispensed with.

In the invention, it is possible
  to start and stop the material discharge through the outlet die (or an additional deposition die) and
  to regulate the discharged volume flow.

The following advantages can be achieved:
- interrupting a continuous extrusion process with short switching times;
- implementing a start-stop function;
- avoiding that material is entrained to/via the component to be manufactured;
- consistently homogeneous structures (for example, consistent strand width); and
- avoiding overcharging in boundary regions, narrow radii or at geometrically-related reversal points.

The field of application that offers the greatest potential is generative/additive manufacturing by way of extrusion-based method, especially in the case of bulky component structures. In addition, a use in all areas of extrusion technology is conceivable. For example, the invention can also be employed with concrete 3D printing in the building industry and 3D printing of foods (chocolate, pastes or pureed foodstuffs).

DESCRIPTION OF THE DRAWINGS

The invention will be described by way of example hereafter.

In the drawings.

DETAILED DESCRIPTION OF THE INVENTION

Figure 1:
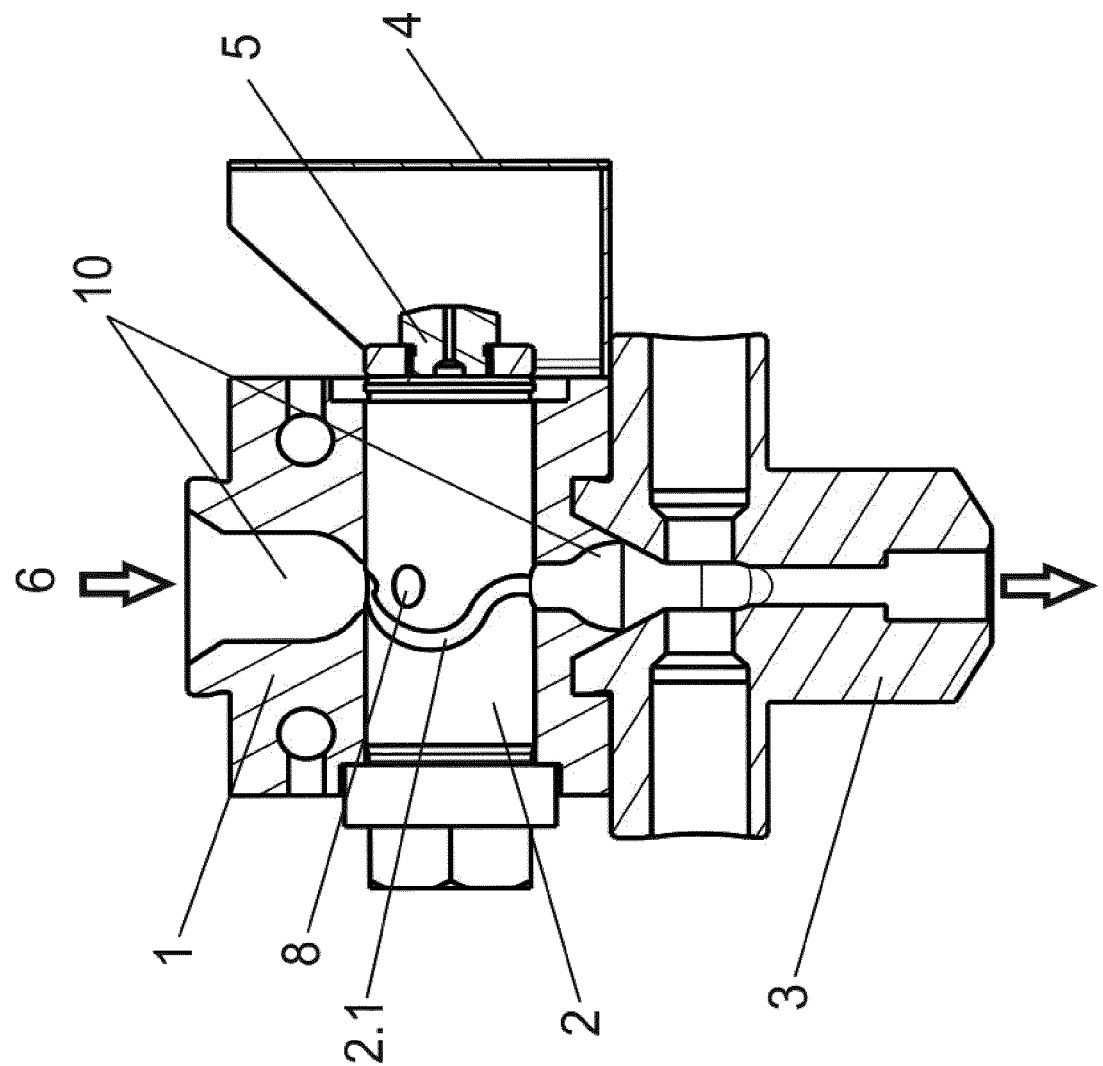
FIG. 1 shows a schematic sectional illustration of an example of a device according to the invention in a position in which the fed volume flow can be influenced.

FIG. 1 shows a flange 1, which at what here is the vertically upper side is connected to an extrusion unit, which is not shown. The extrusion unit feeds extruded plastically deformable material 6 in a channel 10, which runs through the flange 1, to the outlet die 3, which is clarified by the arrows.

A borehole is formed through the flange 1, perpendicularly to the longitudinal axis of the channel 10, or a hollow cylinder is inserted there. A piston 2 is rotatably mounted in the borehole or the hollow cylinder. In addition, seals are present, which are to prevent extrudate from leaking.

It is also apparent from FIG. 1 that a groove 2.1 is formed in the outer lateral face of the piston 2, through which the extruded plastically deformable material 6 can be fed to the outlet die 3 for additive manufacturing. A borehole 8 also is present on the outer lateral face of the piston 1 and runs into the interior of the piston 1 to a bypass channel 9, which, in turn, opens into a bypass die 5 (see FIG. 2).

The borehole 8 and the groove 2.1 are arranged in the example shown in FIG. 1 so that the groove 2.1 is guided in an arc around the borehole 8.

In the angular position of the piston 2 shown in FIG. 1, the borehole 8 does not communicate with the channel 10, so that extruded plastically deformable material 6 can be exclusively fed through the groove 2.1 to the outlet die 3.

When the piston 2 is rotated, in a manner not shown in FIG. 1, into an angular position in which plastically deformable material 6 can also find its way into the borehole 8, then through the bypass channel 9, and the bypass die 5, into a collection receptacle 4, only a portion of the entire volume flow of extruded plastically deformable material 6 which is fed from the extrusion unit is fed through the groove 2.1 to the outlet die 3. In this way, the volume flow of extruded plastically deformable material 6 which is provided for manufacturing in this angular position of the piston 2 can be influenced.

Figure 2:
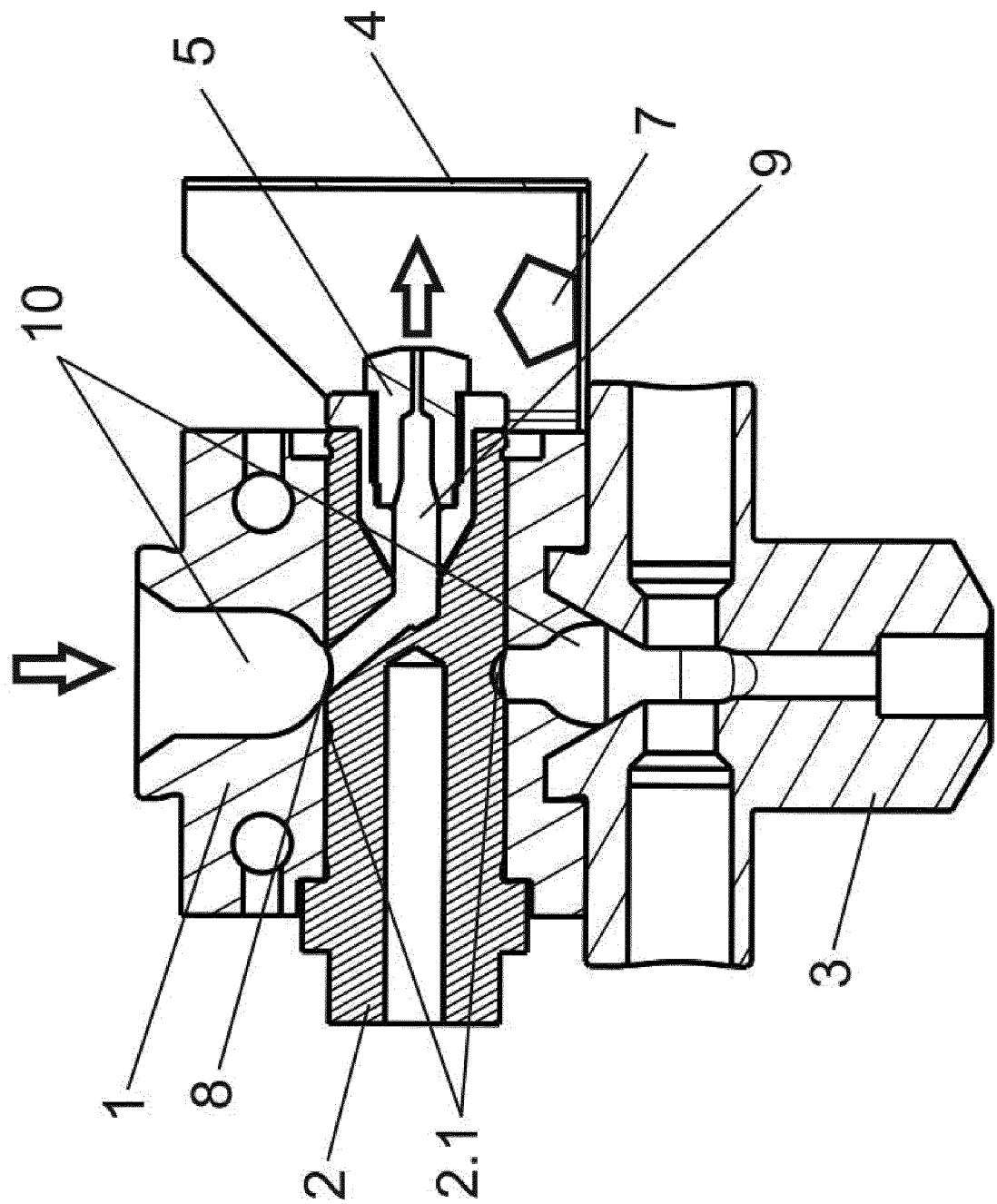
FIG. 2 shows the example shown in FIG. 1 in a position in which the feeding of extruded plastically deformable material to the outlet die is interrupted.

FIG. 2 shows a position of the piston 2 in which the pistons has been rotated into an angular position in which the groove 2.1 does not communicate with the channel 10. As a result, no connection exists between the extrusion unit and the outlet die 3.

Extruded plastically deformable material fed from the extrusion unit into the channel 10 is fed entirely into the borehole 8, from there through the bypass channel 9 to the bypass die 5, and from there, in this example, into the collection receptacle 4, where it can be temporarily stored as waste 7 or for reuse.

The invention claimed is:

1. A device for influencing the volume flow of extruded plastically deformable material, which is fed to an outlet die during the additive manufacturing of components, comprising a flange, which is arranged between an extrusion unit and an outlet die and connected to the extrusion unit and the outlet die, wherein a channel connects the extrusion unit to the outlet die a piston is mounted in the flange so as to rotate perpendicular to a longitudinal axis of the channel a borehole is formed in the piston in the region of the channel, the borehole connects to a bypass channel that runs through the piston to a bypass die; at least one groove is formed in a region of the channel on an outer lateral face of the piston, and the at least one groove is arranged in a different angular area than the borehole or is located around the borehole, so that the extruded plastically deformable material can be fed, depending on angular positions of the piston, through the at least one groove to the outlet die and simultaneously through the borehole and the bypass channel to the bypass die to influence the volume flow of the extruded plastically deformable material, or the extruded plastically deformable material solely is fed through the borehole and bypass channel to the bypass die and the expanded plastically deformable material which exits the bypass die is returned to the extrusion unit is stored.

2. The device according to claim 1, wherein the at least one groove is formed in an outer lateral face of the piston across an angular range of at least 180° in the direction of rotation of the piston.

3. The device according to claim 1, wherein the at least one groove has a free cross-section that varies in a stepped or continuous manner across the length thereof, through which extruded plastically deformable material can be fed to the outlet die, when the piston has been rotated into an appropriate angular position.

4. The device according to claim 1, wherein multiple grooves are formed in angular ranges that are offset from one another, in an outer lateral face of the piston.

5. The device according to claim 1, wherein the piston is connected to a rotary drive controllable by open-loop or closed-loop control.

\* \* \* \* \*